US009264484B1

(12) United States Patent
Moxley et al.

(10) Patent No.: US 9,264,484 B1
(45) Date of Patent: Feb. 16, 2016

(54) ATTRIBUTING PREFERENCES TO LOCATIONS FOR SERVING CONTENT

(75) Inventors: Emily K. Moxley, San Francisco, CA (US); Vinod Anupam, Cupertino, CA (US); Hobart Sze, Mountain View, CA (US); Dani Suleman, Fremont, CA (US); Khanh B. Nguyen, Cupertino, CA (US)

(73) Assignee: Google Inc., Mountain View, CA (US)

( * ) Notice: Subject to any disclaimer, the term of this patent is extended or adjusted under 35 U.S.C. 154(b) by 127 days.

(21) Appl. No.: 13/024,274

(22) Filed: Feb. 9, 2011

(51) Int. Cl.
*G06F 15/16* (2006.01)
*H04L 29/08* (2006.01)

(52) U.S. Cl.
CPC ............... *H04L 67/10* (2013.01); *G06F 15/16* (2013.01); *H04L 67/26* (2013.01)

(58) Field of Classification Search
CPC ......... H04L 67/10; H04L 67/26; H04L 67/06; G06F 17/30017
USPC ............ 709/203, 223–225, 217, 24; 707/783, 707/791
See application file for complete search history.

(56) References Cited

U.S. PATENT DOCUMENTS

| | | | |
|---|---|---|---|
| 2005/0197908 A1* | 9/2005 | Asami | 705/26 |
| 2007/0219910 A1* | 9/2007 | Martinez | 705/51 |
| 2008/0091796 A1* | 4/2008 | Story et al. | 709/217 |
| 2008/0154718 A1* | 6/2008 | Flake et al. | 705/14 |
| 2008/0268876 A1* | 10/2008 | Gelfand et al. | 455/457 |
| 2010/0005070 A1* | 1/2010 | Moriya | 707/E17.001 |
| 2010/0094878 A1* | 4/2010 | Soroca et al. | 707/748 |

OTHER PUBLICATIONS

U.S. Appl. No. 10/510,548, filed Jan. 2010, Moriya.*

* cited by examiner

*Primary Examiner* — Vivek Srivastava
*Assistant Examiner* — Normin Abedin
(74) *Attorney, Agent, or Firm* — Fish & Richardson P.C.

(57) ABSTRACT

Methods, systems, and apparatus, including computer programs encoded on a computer-readable storage medium, for providing content, comprising: identifying a social action that includes a preference designation for an object; determining a location of an individual user associated with the social action or a location associated with the object that is the subject of the preference designation; attributing the preference designation to both the location and to the individual user, where the attributed preference designation can be used to target further content to either the individual user or other users; and receiving a request for content that is related to the location and providing, responsive to the request, one or more content items based on the attributed preference designations.

12 Claims, 4 Drawing Sheets

ATTRIBUTING PREFERENCES TO LOCATIONS FOR SERVING CONTENT

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through an auction. For example, content sponsors can provide bids specifying amounts that the sponsors are respectively willing to pay for presentation of their content. In turn, an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing content. The method comprises: identifying a social action that includes a preference designation for an object; determining a location of an individual user associated with the social action or a location associated with the object that is the subject of the preference designation; attributing the preference designation to both the location and to the individual user, where the attributed preference designation can be used to target further content to either the individual user or other users; and receiving a request for content that is related to the location and providing, responsive to the request, one or more content items based on the attributed preference designations.

These and other implementations can each optionally include one or more of the following features. The preference designation can be a designation that the individual user likes certain content. The preference designation can be a designation that the individual user supports certain content. The preference designation can be a designation that the individual user has re-published certain content. The preference designation can be a designation by the individual user in a social context of a preference to certain content. The social action can be a click designation. The location can be a physical location of the individual user at the time the preference designation is made. The location can be an attributed location for the individual user at the time the preference designation is made. Providing one or more content items can include providing an advertisement. Providing one or more content items can include providing one or more content items that are deemed popular in a location area associated with the location based at least in part on historically-attributed preference designations. Providing one or more content items can include providing one or more web pages that are deemed popular in a location area associated with the location based at least in part on historically-attributed preference designations. Attributing the preference designations can include storing the preference designations in a profile associated with the location. The method can further comprise filtering preference designations in accordance with a temporal scheme to maintain only current preference designations for a given location. The method can further comprise storing the preference designations in association with the location, filtering the preference designations over time in accordance with a first filter function to provide filtered preference designations, and using the filtered preference designations in response to received requests. The object can be online content. The object can be an ad.

In general, another innovative aspect of the subject matter described in this specification can be implemented in methods that include a method for providing content, comprising: receiving a preference designation for an object from a client device; determining a location of the client device or a location associated with the object that is the subject of the preference designation; attributing the preference designation to the location, where the attributed preference designation can be used to target further content to either an individual user associated with the client device or other users responsive to received requests that are related to the location; and receiving a request for content that is related to the location and providing, responsive to the request, one or more content items based on the attributed preference designation.

In general, another innovative aspect of the subject matter described in this specification can be a computer program product tangibly embodied in a computer-readable storage medium and comprising instructions that when executed by a processor perform a method for providing content, the method comprising: identifying a social action that includes a preference designation for an object; determining a location of an individual user associated with the social action or a location associated with the object that is the subject of the preference designation; attributing the preference designation to both the location and to the individual user, where the attributed preference designation can be used to target further content to either the individual user or other users; and receiving a request for content that is related to the location and providing, responsive to the request, one or more content items based on the attributed preference designations.

In general, another innovative aspect of the subject matter described in this specification can be a system for providing content, comprising: a processor; and at least one computer-readable storage device comprising instructions that, when executed by the processor, cause the system to: identify a social action that includes a preference designation for an object; determine a location of an individual user associated with the social action or a location associated with the object that is the subject of the preference designation; attribute the preference designation to both the location and to the individual user, where the attributed preference designation can be used to target further content to either the individual user or other users; and receive a request for content that is related to the location and provide, responsive to the request, one or more content items based on the attributed preference designations.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
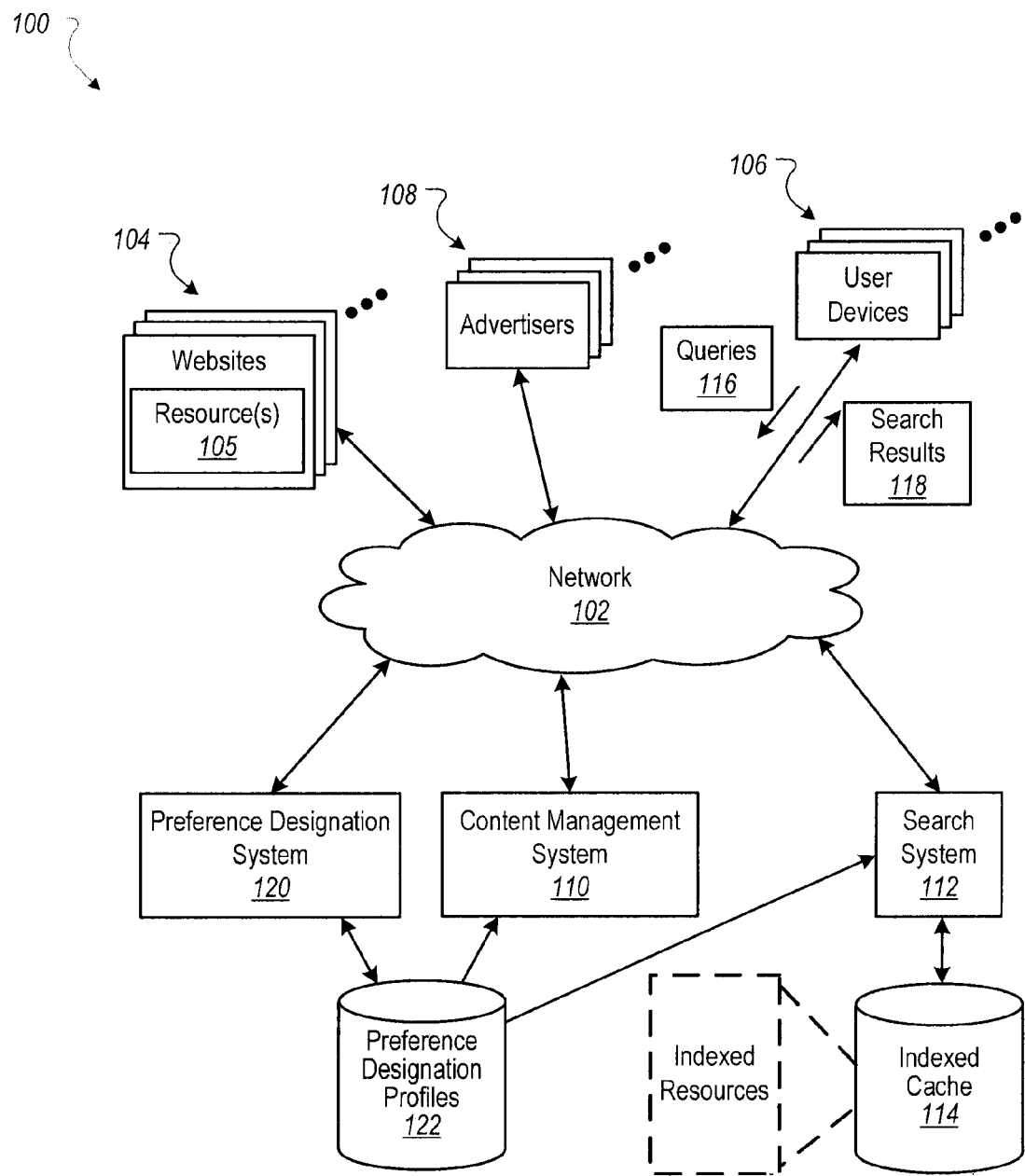
FIG. 1 is a block diagram of an example environment for attributing preference designations to a location and serving content based on the preference designations.

This document describes methods, processes and systems for attributing preference designations to a location and serving content based on the preference designations. Social signals, such as user preferences for various online content (e.g., web pages, ads, etc.), can be attributed to people, such as the person that provides the preference indication. A person can be attributed to one or more locations, such as cities or other places. A person's place attribution can change over time, such as if a person moves to a new city, or if the person is using a mobile computing device in a different geographic area, to name a few examples. Rather than associating a preference solely with a person (e.g., the user who made the preference), a preference attribution system (and associated methods) can be used to attribute the preference with a place or location associated with the user preference. For example, a user may make a preference designation while being physically at a location, e.g., at a downtown café in San Francisco. In another example, the user may make a preference designation on web page content that is associated with a location, such as a web page for Yosemite Park or a restaurant in San Francisco (e.g., regardless of where the user is at the time of making the preference designation). In this example, the location that is attributed with the preference is the location associated with the object that is the subject of the preference designation, e.g., the online content upon which the user is designating a preference. As will be described in greater detail below, the location is relevant to the preference in addition to the user who made the preference. Associating and recording the locations of such preferences can allow the popularity of locations to be learned over time, such as based on hundreds or thousands of users. The information for location-based preferences can be used, for example, to serve content, including ads, to users who are physically in the areas or near the locations. The information for location-based preferences can also be used to serve content to users that are requesting content corresponding to one or more of the locations.

In some implementations, whenever a preference designation is made, an attribution service can automatically record the location as well as the identification of the user who designated the preference. Example preference designations can include sharing or re-publishing the content (e.g., using a +1, or plus-one, or other control), liking content, supporting content, or other forms of preference designations. In some implementations, the preference designation can have a negative connotation, such as if the user provides a negative score or feedback, or if the user selects a negative-comment control. The attribution service then aggregates these preferences can attribute the preferences to, not only the user, but also to the location associated with the user preference. For example, the location can be the location in which the user resides when the preference is made (e.g., the user is in San Francisco), or the location associated with the content upon which the user made the preference (e.g., the user designates a preference for a website related to San Francisco). In some implementations, the attribution service can provide popularity, unpopularity or overall quality scores for any content (e.g., webpages, ads, etc.) for a set of users, for a particular location, or for a set of users in a particular location. In some implementations, the attribution service can use preference designations to select content based on the preference designations.

When a preference designation is made by the user, the location associated with a preference designation can be determined in various ways. For example, determining the user's current position or location can be done using GPS capabilities of the user's mobile computing device, communication (e.g., triangulation) from communication towers with which the user's mobile device communicates, the IP address of the user's computing device, or in other ways. In some implementations, the location that is the subject of the preference designation can be obtained from place names or other information (e.g., from embedded driving directions) from online map services, or from keywords or other embedded content corresponding to a web page or ad that the user is viewing.

FIG. 1 is a block diagram of an example environment 100 for attributing preference designations to a location and serving content based on the preference designations. The example environment 100 includes a content management system 110 for selecting and providing content in response to requests for content and a preference designation system 120 for attributing preference designations based on location. The example environment 100 includes a network 102, such as a local area network (LAN), a wide area network (WAN), the Internet, or a combination thereof. The network 102 connects websites 104, user devices 106, content providers (e.g., advertisers 108), publishers, the content management system 110, and the preference designation system 120. The example environment 100 may include many thousands of websites 104, user devices 106, and advertisers 108.

The preference designation system 120 can receive a user's preference designation, determine the locations(s) associated with the preference designation, and store the attributed location information with the preference designations along with information that attributes the preference to the user. For example, location-attributed preference designation can be stored in preference designation profiles 122.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that personally identifiable information is not determined for the user, or a user's geographic location may be generalized where location information is obtained (such as to a city, ZIP code, or state level), so that a particular location of a user cannot be determined.

When a preference designation is made by the user, the preference designation system 120 can determine the associated location in various ways. For example, to determine the location of the user's current location, GPS or other positioning capabilities of the user's device can be used. Locations can also be determined from communication systems with which a user's mobile computing device communicates. In another example, the user's IP address can be used to perform a reverse look-up of the user's location (e.g., for a home computer). Locations can also be obtained from information corresponding to content that is displayed on the user's computer. For example, a location can be obtained from the source or destination specified by the user. In another example, the location can be obtained from place names or other information that is embedded in driving directions provided by online map services. In another example, locations can be obtained from keywords or other embedded content corresponding to a web page or ad that the user is viewing.

When a preference designation is stored, e.g., in the preference designation profiles 122, location information attributed with the preference designation can also be stored. Stored location information can include, for example, latitude/longitude coordinates of a location, the name of a location, the URL of websites associated with the location, or cell information for the location (e.g., for systems that use hierarchical or other cells to represent the entire Earth's surface).

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images and sounds, that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots or ad slots.

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more slots in which other content (e.g., ads) can be presented.

When a resource 105 or search results 118 are requested by a user device 106, the content management system 110 receives a request for content to be provided with the resource 105 or search results 118. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible ads"). For example, eligible ads can include ads having characteristics matching the characteristics of ad slots and that are identified as relevant to specified resource keywords or search queries 116. In some implementations, ads having targeting keywords that match the resource keywords or the search query 116 are selected as eligible ads by the content management system 110.

A targeting keyword can match a resource keyword or a search query 116 by having the same textual content ("text") as the resource keyword or search query 116. For example, an ad associated with the targeting keyword "beaches" can be an eligible ad for an ad request including the resource keyword "beaches." Similarly, the ad can be selected as an eligible ad for an ad request including the search query "beaches."

The content management system 110 can select from the eligible content items that are to be provided for presentation in slots of a resource or search results page based at least in part on results of an auction. For example, for the eligible content items, the content management system 110 can receive bids from content sponsors (e.g., advertisers) and allocate the slots, based at least in part on the received bids (e.g., based on the highest bidders at the conclusion of the auction). The bids are amounts that the content sponsors are willing to pay for presentation (or selection) of their content with a resource or search results page. For example, a bid can specify an amount that a content sponsor is willing to pay for each 1000 impressions (i.e., presentations) of the content item, referred to as a CPM bid. Alternatively, the bid can specify an amount that the content sponsor is willing to pay for a selection (i.e., a click-through) of the content item or a conversion following selection of the content item. The selected content item can be determined based on the bids alone, or based on the bids of each bidder being multiplied by one or more factors, such as quality scores derived from content performance, landing page scores, and/or other factors. In some implementations, the process by which content items are selected by the content management system 110 can be optimized. For example, the content-selection process can consider a satisfaction index (SI) for each content item that is a metric of impressions that have occurred in relation to the delivery goals for the content item.

A conversion can be said to occur when a user performs a particular action related to a content item provided with a resource or search results page. What constitutes a conversion may vary from case-to-case and can be determined in a variety of ways. For example, a conversion may occur when a user clicks on an ad, is referred to a web page, and consummates a purchase there before leaving that web page. A conversion can also be defined by an advertiser to be any measurable/observable user action, such as downloading a white paper, navigating to at least a given depth of a website, viewing at least a certain number of web pages, spending at least a predetermined amount of time on a website or web page, registering on a website, or performing a social action regarding an ad, such as endorsing the ad or making some other preference designation. Other actions that constitute a conversion can also be used. For example, a conversion can also be said to occur if a user makes a preference designation regarding an ad.

Figure 2:
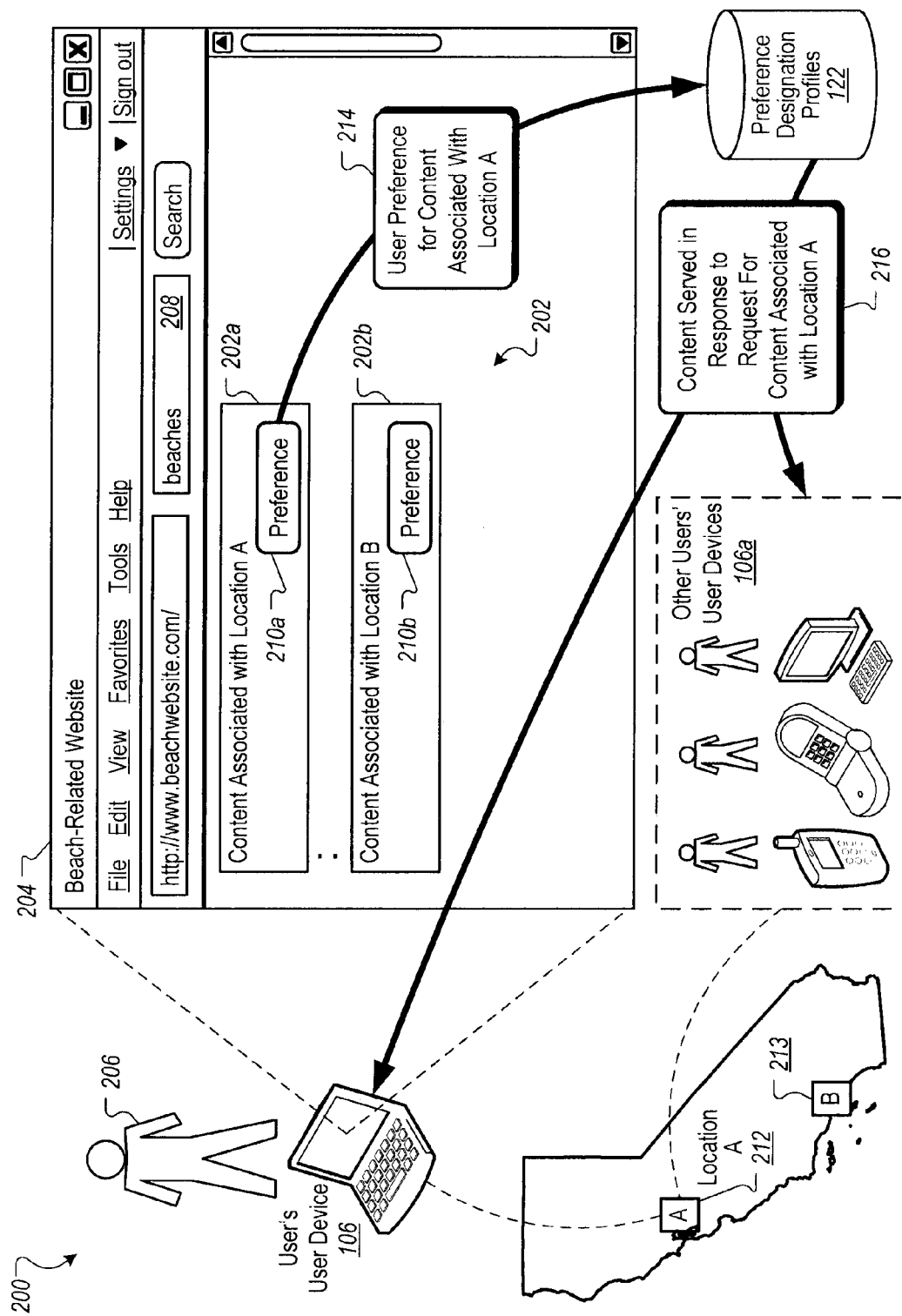
FIG. 2 is a block diagram of an example system for attributing preference designations to a location and serving content based on the preference designations.

FIG. 2 is a block diagram showing an example system 200 for attributing preference designations to a location and serving content based on the preference designations. For example, preference designations can be of the form of any social action made by a user who views content on the Web and takes action to make their preferences known to others, such as in social networking groups. In some implementations, when a user makes a preference known, e.g., to the user's friends or family, the preference can appear in (or be available to) social networking websites. At the same time, the preference can be associated with a location (e.g., a location corresponding to the content or to the user's location) and stored. Over time, user preference designations that are attributed to locations can be used to serve one or more content items (e.g., web pages, ads, etc.) based on the preference designations, including the attributed location information.

As an example, content 202, including content items 202a, 202b and other content items, can be displayed on a web page 204. The web page 204, for example, can be displayed in a browser or other application on the user device 106 of a user 206. In some implementations, referring to FIG. 1, the web page 204 can be displayed after the user 206 selects a particular one of the search results 118 produced by the search system 112 in response to the query 116 (e.g., the query 208 for "beaches"). For example, the content items 202a and 202b can contain content related to beaches (e.g., beaches at location A 212 and beaches at a location B 213, respectively).

The location that is associated with content, such as content contained in or associated with the content items 202a and 202b, can be attributed with the user's preference designation. In some implementations, the location attribution can be associated with the object that is the subject of the preference designation. For example, the content item 202a can be associated with location A 212, such as the City of San Francisco or the area surrounding San Francisco. In this example, San Francisco can be the object of the preference designation if the content item 202a includes content that describes restaurants, museums and/or beaches in the San Francisco area. In some implementations, the location attribution can be determined from the current location of the individual user associated with the preference designation (or other social action). For example, if the user 206 is currently in San Francisco when the preference designation is made, then the location attribution can be determined from and based on the user's current location.

Ways of determining the user's location, for example, can include determining a global positioning system (GPS) location of the user's user device 106. In this example, the location can include the latitude and longitude of the mobile device obtained using the GPS capabilities of the mobile device. In another example, the location of the user device 106 can be obtained through cell triangulation, e.g., from three or more signal transmitters, towers or satellites that serve the user's mobile device. In another example, the location of the user's mobile device can be obtained through periodic mobile check-ins, such as positional checkpoints made by the mobile device at regular intervals. In some implementations, if the user has a map displayed in a map application, for example, then the location can be obtained from the coordinates of the map's center-point (or other screen position), using the viewport of the device. In some implementations, the location of the user device 106 can be determined based on the user device's connection to a mobile or wireless network, such as the Internet. For example, if the user of the user device 106 is on the Web using a map application, then the location of the user device can be determined from driving directions that the user has requested and/or that have been provided by the map application. In some implementations, the driving directions can be parsed to locate and extract place names (e.g., business names, street names, city names, etc.) or other information for specific locations. Using a name obtained from the driving directions, for example, a reverse look-up can be performed to obtain an IP address that corresponds to the name (e.g., a business name, street name, etc.), and then the geographical location can be determined from the IP address.

In some implementations, multiple locations can be attributed to a preference designation. For example, a first location that is attributed can be based on the user's current location, and a second location can be determined from the object that is the subject of the preference designation, e.g., the content being viewed by the user. These two locations can be the same location, or different. In some implementations, preference designations that are attributed to a location can be tagged or otherwise identified as to the type of location, e.g., "user device in a location" versus "content about (e.g., subject of) a location)." The preference designations can be stored, such as in the preference designation profiles 122. In some implementations, content served to other users can be filtered based on the type of location, e.g., using stored preference designations tagged with "user device in a location" to serve content to other mobile devices.

Preference controls 210a and 210b, included with content items 202a and 202b, respectively, can provide a mechanism for the user 206 to designate one or more preferences for the corresponding content. Example preference designations include liking, endorsing or supporting certain content. For example, the user can select the preference control 210a to designate that the user 206 likes the content or website associated with the content item 202a. As another example, the user can select the preference control 210a to designate support of the content, such as if the content item 202a is related to a specific environmental, charitable or other socially redeeming cause in which the user 206 is interested in supporting. If the content item 202a is an ad, for example, the user 206 can use the preference control 210a to designate a preference, e.g., whether the user 206 likes the ad or wishes to re-publish the ad.

In some implementations, preference controls such as the preference controls 210a and 210b can be replaced with more than one control, such as separate controls for liking, endorsing and supporting content, each of which can have a separate meaning in social networking groups and/or on social networking applications. In some implementations, selecting a preference control such as one of the preference controls 210a and 210b can cause a pop-up or other control to appear form which the user 206 can select from available preference options (e.g., supporting, endorsing, re-publishing, etc.).

Example preference designations can include a designation that an individual (e.g., the user 206) has re-published certain content. For example, some implementations of the preference controls can allow the user 206 to re-publish content to others, or to specify that content has been re-published to others. As a result, an accounting that the user has re-published the content can be attributed to the content along with the location(s).

In some implementations, preference designations by an individual user can occur in a social context. Example social contexts include user acts to "plus one" or "+1" or otherwise share content with family, friends or other members of the user's social groups (e.g., as identified by social networking websites, etc.). For example, the selection by the user 206 of a preference control, such as one of the preference controls 210a and 210b, can be in the context of making a preference known to one or more people (e.g., friends or family) in a user's social networking group. In some implementations, preference controls, such as one of the preference controls 210a and 210b, can appear on social networking website or be otherwise presented in a browser executing on a client device, allowing the user 206 to make preference designations there. In some implementations, preference controls can be tied to networking websites. In some implementations, preference designations and locations attributed with the preference designations are used to select and target content only within a user's social groups.

In some implementations, a preference designation can be made implicitly, such as if a user navigates to a web page (e.g., associated with a location) or if the user clicks on content (e.g., an ad associated with a location). In this way, click designations from multiple users can be collected over time, where the click designations can be treated as passive preference designations made by users.

In some implementations, the location can be a physical location of the individual user at the time that the preference designation is made. For example, if the location of the user device 206 cannot be determined automatically (e.g., from the GPS location of the user's mobile device or from other ways described previously), then the user can be prompted for a current location. In some implementations, the user can select or specify a location (e.g., using a "Where are you?" control). In this example, the user can identify the location by entering the name of a city or a ZIP code for the user's current location.

In some implementations, the location can be an attributed location for the individual user at the time the preference designation is made. For example, at the time that the user makes a preference designation, the user can be prompted to specify a location to be attributed to the preference designation (e.g., using a "What location is this preference about?" control).

Upon making a preference designation for certain content and determining and/or the user providing one or more locations, the preference designation can be attributed to one or more locations and stored. For example, if the user 206 selects the preference control 210a in order to designate a preference for content associated with the content item 202a, then a preference designation 214 can be stored, e.g., in the preference designation profiles 122. In this example, the preference designation 214 can identify that the user 206 (e.g., an anonymized user identifier) preferred the "Content Associated with Location A" (e.g., content of the content item 202a) that is associate with location A 212. In some implementations, the URL of the website that is associated with the content item 202a can be stored in the preference designation profiles 122 with other information from the preference designation 214.

Subsequently, such as after several preference designations have occurred over time, a request can be received for content that is related to a location. For example, other users may be running browsers, such as to experience content on one or more web pages on the Internet. The one or more users may be in a particular location (e.g., at or near location A 202), or the users may search for content that is related to a location (e.g., content related to an object that is the subject of location A 202). As a result, content can be requested that is related to location A 202. In response to the request, one or more content items based on the attributed preference designations can be provided.

For example, if the request is for content, the search engine 112 can provide search results to the other users' user devices 106a that are based, at least in part, on the location-attributed preference designations stored in the preference designation profiles 122. For example, if the request is for an ad, the content management system 110 can select and serve one or more ads to the other users' user devices 106a that are based, at least in part, on the location-attributed preference designations stored in the preference designation profiles 122.

Figure 3:
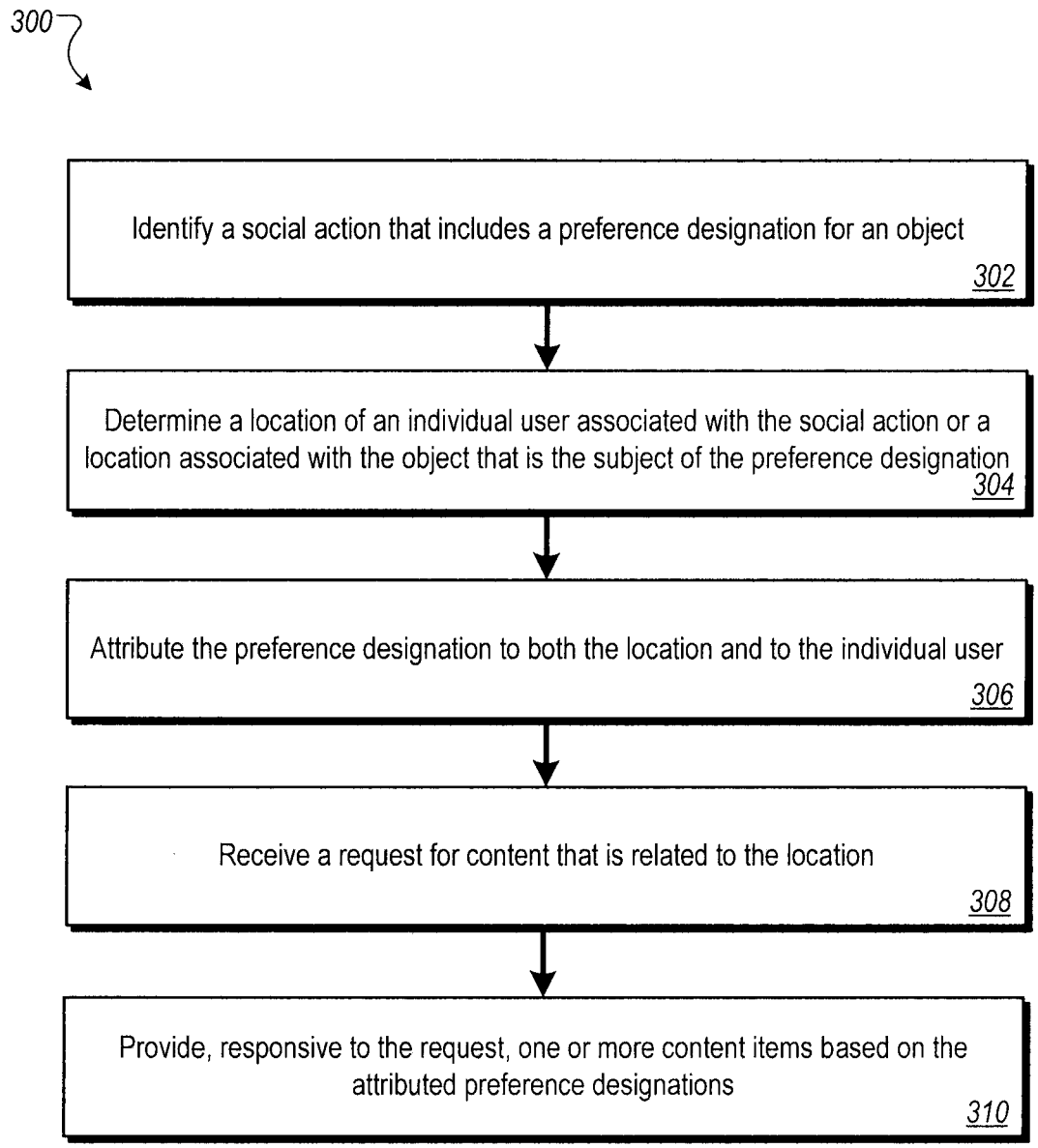
FIG. 3 is a flowchart of an example process for attributing preference designations to a location and serving content based on the preference designations.

FIG. 3 is a flowchart of an example process 300 for attributing preference designations to a location and serving content based on the preference designations. The process 300 can be performed, for example, by the content management system 110 and the preference designation system 120.

A social action is identified that includes a preference designation for an object (302). For example, referring to FIG. 2, a user 206 who is viewing the content item 202a on the web page 204 can select the preference control 210a. By selecting the preference control 210a, for example, the user is performing a preference designation that also serves as a social action, such as to endorse, like, or support the content. In some implementations, the user can select the preference control 210a to re-publish the content (e.g., re-publish the content to friends or family), or to indicate that the user has re-published the content, and the preference designation can be determined at the same time.

A location is determined, where the location is a location of an individual user associated with the social action or a location associated with the object that is the subject of the preference designation (304). Referring to FIG. 2, the location that is determined can be, for example, the user's current location (e.g., San Francisco) if the user 206 is currently browsing the Internet while residing in San Francisco. Example ways of determining the user's location, described previously with respect to FIG. 2, include using the GPS location of the user's user device 106, using cell triangulation from towers and/or satellites that serve the user's mobile device, or periodic mobile check-ins. In some implementations, if the user 206 is using an online map application, then the location can be obtained from the coordinates of the map's center-point (or other position), or from driving directions that the user has requested and/or that have been provided by the map application. In some implementations, the location of the user device 106 can be determined based on the user device's connection to a mobile or wireless network, such as the Internet. Other ways for determining the location are possible.

In some implementations, the location that is determined can be the location of the object that is the subject of the preference designation. For example, the location can be the location associated with content of the content items 202a and 202b, e.g., the location A 212 corresponding to the City of San Francisco or the area surrounding. In this example, San Francisco may be the object of the preference designation if, for example, the content item 202a includes content that describes San Francisco area restaurants, museums, beaches or other points of interest.

The preference designation is attributed to both the location and to the individual user (306). The attributed preference designation can be used to target further content to either the individual user or other users. For example, using the location (e.g., San Francisco) attributed with the preference designation, the preference designation system 120 can attribute the user's designated preference with both the location (e.g., San Francisco) and the individual user (e.g., using an anonymized identification as described above). In some implementations, other information can be associated with the attributed information at this time, such as the URL of the website that the user is viewing at the time that the preference designation is made.

A request is received for content that is related to the location (308). For example, the request can be a request for a web page, or the request can be a request for an ad to fill an ad slot. The request for content can be related to the location either because the request originates from the location (e.g., from one of the other users' user devices 106a that is in San Francisco at the time of the request) or because the location is at least part of the subject of the request (e.g., a search query for San Francisco restaurants, or an ad request for a San Francisco restaurant).

In response to the request, one or more content items based on the attributed preference designations are provided (310). For example, in response to a request for San Francisco-related content from one of the other user's user devices 106a, the content management system 110, for example, can select content based on the preference designations. In some implementations, the content management system 110 can use information (e.g., search results) from the search system 112 and provide content items responsive to the request using the preference designations (e.g., from the preference designation profiles (122). In this way, one or more content items (e.g., including web pages and ads) can be served that are deemed popular in a location area (e.g., San Francisco) that is associated with the location based at least in part on historically-attributed preference designations (e.g., preference designations made in San Francisco).

In some implementations, preference designations can be filtered over time in accordance with a temporal scheme in order to maintain only current preference designations for a given location. For example, preference designations for San Francisco can be purged or expired intermittently from the preference designation profiles 122, such as to discontinue the use of preference designations of a certain age (e.g., more than a year old). In some implementations, different filtering schemes can be used for different locations, such as if requests for content in one location are more sensitive to temporal change than in other locations.

In some implementations, after storing the preference designations in association with the location (e.g., in the preference designation profiles 122), the preference designations can be filtered over time in accordance with a first filter function to provide filtered preference designations, and the filtered preference designations can be used in response to received requests. For example, filter functions can be related to time, properties of the location, or some other criteria. Over time, the filter functions can be used to filter preference designations, e.g., to omit or filter out preference designations that are thought not to be useful. When, for example, a request for content is received that is associated with the location San Francisco, then filtered preference designations can be used to select content, e.g., in an effort to provide more useful content.

Figure 4:
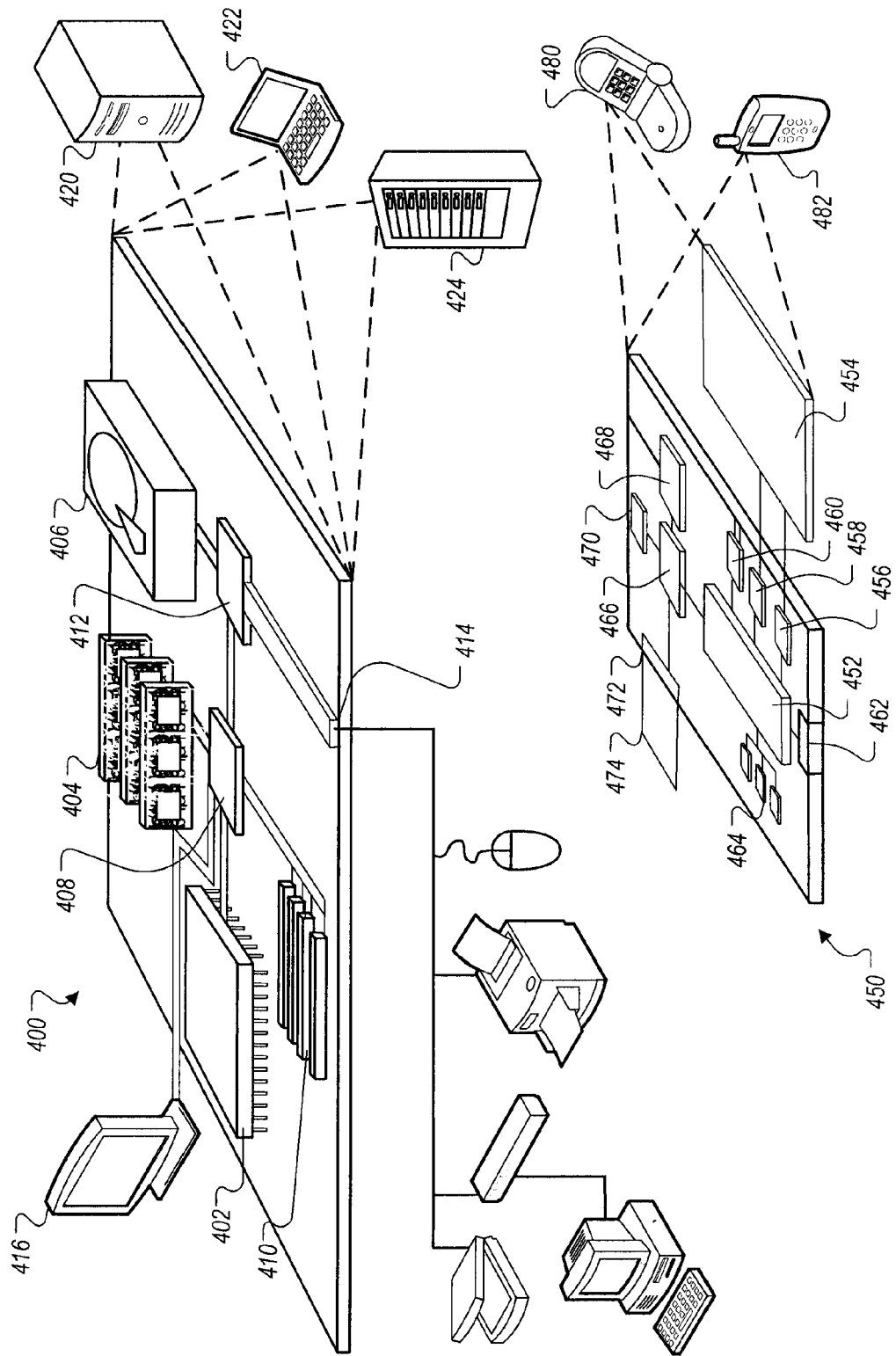
FIG. 4 is block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communication audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described.

Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   identifying a social action that was performed by each of a plurality of different users, the social action specifying a preference designation for a given object, the preference designation being at least one of (i) a designation that the user likes certain content, (ii) a designation that the user supports certain content, (iii) a designation that the user has re-published certain content, or (iv) a designation by the user in a social context of a preference to certain content;
   determining that each given user from the plurality of different users was located at a given location at a time the social action specifying the preference designation was performed by the given user;
   attributing the preference designation of each given user to the given location, where the attributed preference designation is a user independent designation that is used to identify further content to be provided to users at a location area proximate to the given location, wherein attributing includes:
      creating a first association between the given location and the preference designation; and
      storing the first association and the preference designations in a profile for the given location;
   receiving a request for content from a user device that is within the location area and different from those in the plurality of different users; and
   providing, responsive to the request and based on the user device being located in the location area, a content item for the given object based on the profile for the given location including multiple stored first associations between the given location and the preference designation for the given object, the multiple stored first associations being created in response to social actions performed by multiple different users that specify a preference for the given object.

2. The method of claim 1, wherein the social action is a click designation.

3. The method of claim 1, wherein the given location is an attributed location for the user at the time the preference designation is made.

4. The method of claim 1, wherein providing the content item includes providing an advertisement.

5. The method of claim 1, wherein providing the content item includes providing a web page that is deemed popular in the location area based at least in part on historically-attributed preference designations of the multiple different users.

6. The method of claim 1, further comprising filtering preference designations in accordance with a temporal scheme to maintain only current preference designations for the given location.

7. The method of claim 1, further comprising filtering the preference designations over time in accordance with a first filter function to provide filtered preference designations, and using the filtered preference designations in response to received requests.

8. The method of claim 1, wherein the given object is online content.

9. The method of claim 1, wherein the object is an ad.

10. A method comprising:
    receiving, from a plurality of different client devices, a preference designation for a given object, the preference designation being at least one of (i) a designation that the user likes certain content, (ii) a designation that the user supports certain content, (iii) a designation that the user has re-published certain content, or (iv) a designation by the user in a social context of a preference to certain content;
determining that each particular client device from the plurality of different client devices was located at a given location at a time of receipt of the preference designation;
attributing, to the given location, the preference designation, wherein the attributed preference designation is used to identify further content to be provided to client devices located at a location area proximate to the given location, wherein attributing includes:
creating a first association between the given location and the preference designation; and
storing the first association and the preference designations in a profile for the given location;
receiving, from a given client device, a request for content that is related to the location; and
providing, responsive to the request and based on the request being for content that is related to the location, a content item for the given object based on the profile for the given location including multiple stored first associations between the given location and the preference designation for the given object, the multiple stored first associations being created in response to preference designations for the given object being received from multiple different client devices.

11. A computer program product tangibly embodied in a non-transitory computer-readable storage medium and comprising instructions that when executed by a processor perform a method for providing content, the method comprising:
identifying a social action that was performed by each of a plurality of different users, the social action specifying a preference designation for a given object, the preference designation being at least one of (i) a designation that the user likes certain content, (ii) a designation that the user supports certain content, (iii) a designation that the user has re-published certain content, or (iv) a designation by the user in a social context of a preference to certain content;
determining that each given user from the plurality of different users was located at a given location at a time the social action specifying the preference designation was performed by the given user;
attributing the preference designation of each given user to the given location, where the attributed preference designation is a user independent designation that is used to identify further content to be provided to users at a location area proximate to the given location, wherein attributing includes:
creating a first association between the given location and the preference designation; and
storing the first association and the preference designations in a profile for the given location;
receiving a request for content from a user device that is within the location area and different from those in the plurality of different users; and
providing, responsive to the request and based on the user device being located in the location area, a content item for the given object based on the profile for the given location including multiple stored first associations between the given location and the preference designation for the given object, the multiple stored first associations being created in response to social actions performed by multiple different users that specify a preference for the given object.

12. A system for providing content, comprising:
a processor; and
at least one computer-readable storage device comprising instructions that, when executed by the processor, cause the processor to:
identify a social action that was performed by each of a plurality of different users, the social action specifying a preference designation for a given object, the preference designation being at least one of (i) a designation that the user likes certain content, (ii) a designation that the user supports certain content, (iii) a designation that the user has re-published certain content, or (iv) a designation by the user in a social context of a preference to certain content;
determine that each given user from the plurality of different users was located at a given location at a time the social action specifying the preference designation was performed by the given user;
attribute the preference designation of each given user to the given location, where the attributed preference designation is a user independent designation that is used to identify further content to be provided to users at a location area proximate to the given location, wherein attributing includes:
creating a first association between the given location and the preference designation; and
storing the first association and the preference designations in a profile for the given location;
receive a request for content from a user device that is within the location area-and different from those in the plurality of different users; and
provide, responsive to the request and based on the user device being in the location area, a content item for the given object based on the profile for the given location including multiple stored first associations between the given location and the preference designation for the given object, the multiple stored first associations being created in response to social actions performed by multiple different users that specify a preference for the given object.

* * * * *